United States Patent Office 2,878,134
Patented Mar. 17, 1959

2,878,134

PIGMENTS AND PROCESS OF MAKING THEM

Louis John Gagliano, Glens Falls, and James Ernest Daly, Hudson Falls, N. Y.

No Drawing. Application July 18, 1955
Serial No. 522,854

16 Claims. (Cl. 106—301)

This invention relates to inorganic sulfide pigments and has for its object the provision of cadmium-mercury sulfide pigments and a process of producing the pigments.

The most immediately related pigments are the cadmium-selenide-sulfide pigments which vary in color from orange through red and maroon, the darker hues containing higher amounts of selenium, and because of their many well known desirable properties, such as resistance to heat, weathering, acids and alkalies, they are widely used. When these pigments are fairly pure, being relatively free of diluents, they are known as "C. P." (commercially pure) type pigments, but when they contain an extender such as barium sulfate they are known as "lithopone" type pigments.

The cadmium-mercury sulfide pigments of our invention are superior to the cadmium-selenide-sulfide pigments in having improved color characteristics, being brighter, cleaner and stronger in tints, and have economic advantages because mercury is more readily available and at a lower price than is selenium.

The cadmium-mercury sulfide pigments are not similar to physical mixtures of cadmium sulfide and mercury sulfide but are a combination of the two compounds in a single unique crystal, as a solid solution, which is formed by heating, preferably calcining, a mixture of cadmium sulfide and mercury sulfide to a temperature above 400° C. in a non-oxidizing or reducing atmosphere until the desired color is developed.

Our preferred pigments contain no selenium. However, the introduction of some selenium into the calcined cadmium sulfide crystal in addition to the mercury gives a different pigment having desirable properties. This addition of selenium results in a cadmium-mercury-selenide sulfide crystal in which both the mercury and the selenium contribute to the desired color.

Our new pigments may be produced in the so-called "lithopone" and "C. P." types. The lithopone type pigments contain barium sulfate as an extender, which is formed in situ during the manufacturing process. The "C. P." pigments contain no extender. If the solutions used to precipitate the cadmium and mercury sulfides prior to calcining contain cadmium and/or mercury sulfate and barium sulfide, then barium sulfate is precipitated with the cadmium and mercury sulfides and appears in the final pigment as an extender, giving the lithopone type. If the solutions contain, for example, cadmium and mercury sulfate, and sodium sulfide, then soluble sodium sulfate is formed which may be washed out of the precipitate resulting in the so-called "C. P." type pigment. The barium sulfate extender performs the well known function of reducing the amount of colored pigment without corresponding loss of color intensity.

In producing pigments of the invention it is necessary to provide an intimate mixture of finely divided cadmium and mercury sulfides before heating to form the new crystal structure. While this mixture may be formed by grinding together the two dry sulfides or mixing together slurries of the separately precipitated sulfides, we find that best results are obtained by co-precipitating the mercury and cadmium sulfides and some extra sulfur from a solution containing both dissolved mercury and cadmium salts in a predetermined ratio, and a stoichiometric equivalent of a solution of a sulfide in which has been dissolved some elemental sulfur. The extra sulfur is also precipitated along with the sulfides of cadmium and mercury and is subsequently volatilized in the calcining operation. The volatilization of the extra sulfur during calcining is desirable for the best color development. It is not known whether the sulfur vapors create an inert or reducing atmosphere or contribute in some other way to the beneficial results in the calcining operation. Elemental selenium may be used instead of elemental sulfur in the above process. When this is done some of the selenium replaces some of the sulfur in the pigment during calcining to produce a pigment containing mercury, cadmium, sulfur and selenium. Calcining either type in an oxidizing atmosphere will destroy the pigment.

We have found that the pigment of our invention can be improved by washing the calcined product with a hot dilute mineral acid, such as nitric or sulfuric acid. It appears that this washing removes traces of material which affect light sensitivity, resulting in pigments having improved light resistance.

The precipitated sulfides may be concentrated in any suitable way and may be filtered, washed and dried before calcining if desired. However, these specific steps are not essential, particularly for producing the lithopone type pigments, where it may be that no soluble salts remain in the solution after the precipitation.

The calcining operation must be done in a non-oxidizing atmosphere, above 400° C., and the pigment must be heated long enough to effect formation of the desired crystal form.

The heating should not be above about 800° C. and it must not be continued too long or the crystals will grow, giving a "weak" pigment. The calcining operation must embody a combination of temperature and time. Low temperature-long time or high temperature-short time will give similar results. We have obtained the best results by heating the sulfide mixture to about 480° C. for one hour. Other time-temperature combinations are possible and can be determined without difficulty. The time-temperature relations will also be influenced by the heat transfer rate both in heating and cooling the pigment, and is, to a certain extent, a function of furnace design.

The chemistry of the precipitation part of the process seems to be very straightforward. The sulfide and mercury and cadmium salts are used in stoichiometric proportions and appear in the final product in balanced chemical combinations. The shift in color from the yellow of pure calcined cadmium-sulfide to orange is apparent at a mercury to cadmium ratio as low as 0.05 to 1.0. At ratios above 0.5 to 1.0 the color change into the maroon is negligible. These ratios are equivalent to the range of approximately 36 to 4 mols of cadmium sulfide to 1 mol of mercury sulfide.

The following examples are illustrative of processes of making our improved pigments:

*Example 1.—Production of light red lithopone type pigment*

Solution I.—893 ml. of solution containing 175 gm. BaS and 12.8 gm. dissolved sulfur.

Solution II.—470 ml. of solution containing 192 gm. $CdSO_4$.

Solution III.—200 ml. of solution containing 33.5 gm. $HgSO_4$ and 20 gm. NaCl. The NaCl is present to increase the solubility of the $HgSO_4$.

Add Solution II to Solution III and bring the temperature of the combined solution to 25° C. Adjust Solution I to 50° C. and add slowly with stirring the combined Solution II+III to Solution I over a 15 minute period. Digest the precipitate which forms for 1 hour allowing the slurry to cool to room temperature. The pH of the solution will be from 7 to 8. Filter the precipitate, wash it thoroughly, and dry it at 90° C. Calcine the dried precipitate in a closed but not gas-tight furnace for one hour at 480° C. Cool. Pulverize to give the finished pigment. Yield: about 400 gms. of pigment.

*Example 2.—Production of dark red lithopone type pigment*

Solution I.—860 ml. of solution containing 172 gm. of BaS and 18 gm. dissolved sulfur.

Solution II.—437 ml. of solution containing 178.5 gm. $CdSO_4$.

Solution III.—294 ml. of solution containing 49.3 gm. of $HgSO_4$ and 29.3 gm. NaCl.

Process same as Example 1. Yield: about 400 gm. pigment.

*Example 3.—Production of light red C. P. type pigment*

Solution I.—1200 ml. of solution containing 203 gm. $Na_2S$ and 12.8 gm. dissolved sulfur.

Solution II.—1170 ml. of solution containing 482 gm. $CdSO_4$.

Solution III.—382 ml. of solution containing 84 gm. of $HgSO_4$ and 50 gm. NaCl.

Process same as Example 1. Yield: about 400 gm. pigment.

*Example 4.—Production of dark red C. P. type pigment*

Solution I.—1145 ml. of solution containing 196 gm. $Na_2S$ and 18 gm. dissolved sulfur.

Solution II.—1075 ml. of solution containing 440 gm. $CdSO_4$.

Solution III.—550 ml. of solution containing 121 gm. $HgSO_4$ and 72 gm. NaCl.

Process same as Example 1. Yield: about 400 gm. of pigment.

*Example 5.—Production of maroon lithopone type pigment*

Solution I.—875 ml. of a solution containing 175 gm. BaS and 10 gm. of dissolved selenium.

Solution II.—470 ml. of a solution containing 192 gm. $CdSO_4$.

Solution III.—200 ml. of a solution containing 33.5 gm. $HgSO_4$ and 20 gm. NaCl.

Process same as Example 1. Yield: about 400 gm. of pigment.

We claim:

1. Pigments comprising calcined cadmium sulfide and mercury sulfide in the same crystal, the weight ratio of mercury to cadmium being from 0.05/1 to 0.5/1, said pigments ranging in color from orange through red and maroon.

2. Calcined pigments as defined in claim 1 in combination with an extender.

3. Calcined pigments as defined in claim 1 in combination with barium sulfate.

4. Calcined pigments as defined in claim 1 which also include cadmium selenide in the said crystal.

5. The process for producing a crystalline pigment comprising cadmium sulfide and mercury sulfide in the same crystal which comprises calcining a mixture of cadmium sulfide and mercury sulfide in which the weight ratio of mercury to cadmium is from 0.05/1 to 0.5/1 in an inert atmosphere at a temperature above 400° C. for a length of time sufficient to develop a single crystal having a color ranging from orange through red and maroon.

6. In the process of claim 5, calcining a mixture of cadmium sulfide, mercury sulfide with a sufficient amount of free sulfur to form an atmosphere consisting substantially of sulfur vapor.

7. In the process of claim 5, calcining a mixture of cadmium sulfide, mercury sulfide and selenium.

8. In the process of claim 5, washing the calcined product with a dilute mineral acid.

9. In the process of claim 5, carrying out the calcination in a reducing atmosphere.

10. The process for making a pigment consisting of mercury sulfide and cadmium sulfide in the same crystal which comprises admixing an aqueous solution of a soluble mercury salt, a soluble cadmium salt and a solution of a polysulfide, the total sulfur being in excess of that needed to react with the mercury and cadmium to form normal sulfides, the weight ratio of mercury to cadmium being from 0.05/1 to 0.5/1, precipitating simultaneously cadmium sulfide, mercury sulfide and sulfur, separating the precipitate and then calcining the precipitate at a temperature above 400° C. in a non-oxidizing atmosphere for a length of time sufficient to develop a single crystal having a color ranging from orange through red and maroon.

11. In the process of claim 10, washing the calcined product with a dilute mineral acid.

12. In the process of claim 10, admixing with the solution of mercury salt and cadmium salt a solution containing selenium and simultaneously precipitating the selenium with the cadmium and mercury sulfides.

13. The process of forming a cadmium-mercury-sulfide pigment which comprises providing an aqueous solution of salts of cadmium and mercury, at least one of which is a sulfate, admixing barium polysulfide and the aqueous solution of said salts, the total sulfur of the polysulfide being in excess of the stoichiometric amount to form cadmium sulfide and mercury sulfide, the weight ratio of mercury to cadmium being from 0.05/1 to 0.5/1, simultaneously precipitating crystalline cadmium sulfide and mercury sulfide, the excess sulfur, and barium sulfate, separating the total precipitate and calcining it at a temperature above 400° C. in a non-oxidizing atmosphere for a length of time sufficient to develop a single crystal having a color ranging from orange through red and maroon.

14. In the process of claim 13, carrying out the calcination in a reducing atmosphere.

15. In the process of claim 13, carrying out the calcination in an atmosphere of vapors of sulfur.

16. Method of producing a mixed crystal of a solid solution of CdS and HgS of varying shades of red which comprises calcining a mixture of CdS and HgS in a mol ratio of at least 4:1 with an excess of at least 2% of free sulphur in a non-oxidizing atmosphere at a temperature above 400° C. for a period of time sufficient to develop the desired shade of said mixed crystal.

References Cited in the file of this patent

UNITED STATES PATENTS

| | | |
|---|---|---|
| 1,137,467 | Erbner | Apr. 27, 1915 |
| 1,894,931 | O'Brien | Jan. 17, 1933 |
| 2,248,408 | Juredine | July 5, 1941 |
| 2,362,670 | Schulz | Nov. 14, 1944 |
| 2,610,129 | Eversole | Sept. 9, 1952 |
| 2,685,525 | Merker | Aug. 3, 1954 |
| 2,706,791 | Jacobs | Apr. 19, 1955 |
| 2,706,792 | Jacobs | Apr. 19, 1955 |

FOREIGN PATENTS

| | | |
|---|---|---|
| 1,604 | Great Britain | Apr. 20, 1875 |
| 384,473 | Great Britain | Dec. 8, 1932 |

OTHER REFERENCES

Article by Rittner et al. on "Studies of the Coprecipitation of Cadmium and Mercuric Sulfides" to be found on pages 537–543 inclusive of "Physical Chemistry," vol. 47, year 1943.